(12) United States Patent
Seuge

(10) Patent No.: US 6,354,934 B1
(45) Date of Patent: Mar. 12, 2002

(54) HEATING, VENTILATION AND/OR AIR CONDITIONING APPARATUS INCLUDING ONE OR MORE FLAPS CONTROLLED BY A CONTROL DEVICE

(75) Inventor: Olivier Seuge, Swansea (GB)

(73) Assignee: Valeo Climatisation, La Verriere Cedex (FR)

( * ) Notice: Subject to any disclaimer, the term of this patent is extended or adjusted under 35 U.S.C. 154(b) by 0 days.

(21) Appl. No.: 09/435,987

(22) Filed: Nov. 8, 1999

(30) Foreign Application Priority Data

Nov. 12, 1998 (FR) .............................. 98 14198

(51) Int. Cl.$^7$ ............................................. B24D 13/00
(52) U.S. Cl. ......................................... 454/69; 251/279
(58) Field of Search ..................... 454/69, 121, 156, 454/159; 251/279, 294

(56) References Cited

U.S. PATENT DOCUMENTS 4,730,552 A * 3/1988 Murray ........................ 454/69
4,867,047 A * 9/1989 Citron ......................... 454/69
5,700,191 A * 12/1997 Nieling et al. ................ 454/69

FOREIGN PATENT DOCUMENTS

| FR | 2 151 172 | 4/1973 |
| FR | 2 679 621 | 1/1993 |
| FR | 2 737 864 | 2/1997 |
| GB | 2 322 181 | 8/1998 |

* cited by examiner

Primary Examiner—Harold Joyce
Assistant Examiner—Derek S. Boles
(74) Attorney, Agent, or Firm—Morgan & Finnegan, LLP

(57) ABSTRACT

The invention relates to a heating, ventilation and/or air conditioning apparatus that includes a control device and a flap controlled by the control device. The control device includes a control member and a kinematic control linkage of the direct-coupling type arranged between the control member and the flap. The kinematic linkage includes a cable fixed close to its ends and at least one elastic element arranged in such a way as to confer deformability by flexing the kinematic linkage when the flap is at an end stop position. The provided flexibility makes it possible to dispense with the setting-up of the control device and reduces the spring effect in the kinematic linkage.

32 Claims, 3 Drawing Sheets

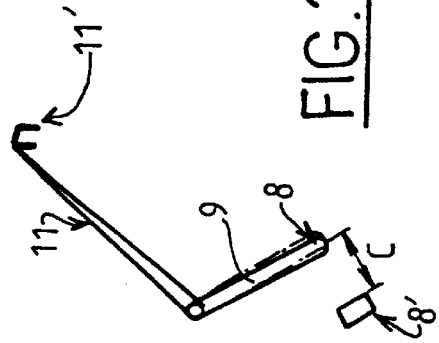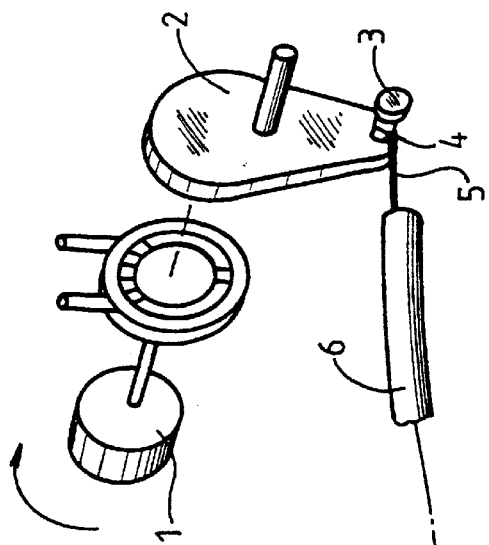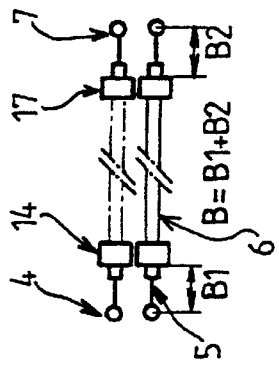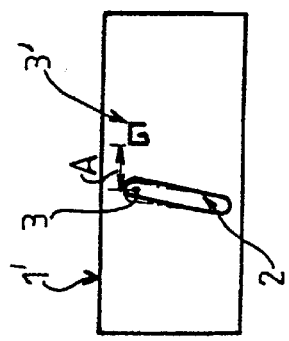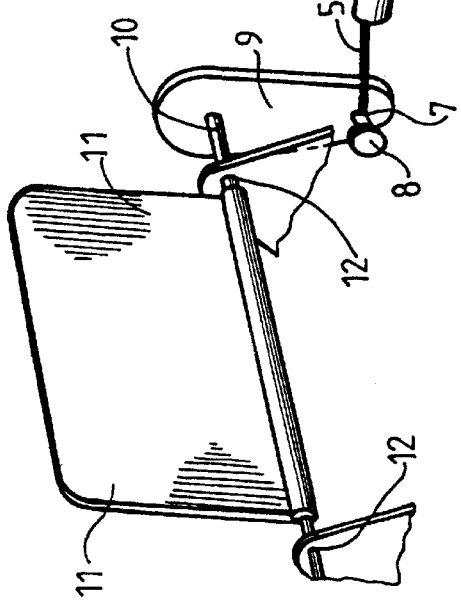

HEATING, VENTILATION AND/OR AIR CONDITIONING APPARATUS INCLUDING ONE OR MORE FLAPS CONTROLLED BY A CONTROL DEVICE

FIELD OF THE INVENTION

The subject of the present invention is a heating, ventilation and/or air conditioning apparatus, particularly but not exclusively for a motor vehicle, including one or more flaps controlled by a control device.

BACKGROUND OF THE INVENTION

At the present time, remote controls via sheathed cable for one or more flaps are fit onto a destination casing by clamping the sheath of the cable using clamps. The clamps must be placed judiciously, generally by experienced operators, so that the flap can be controlled optimally, that is to say while ensuring leaktightness on each of its bearing surfaces.

This operation is called the setting-up of the remote control. At the present time, an operator is obliged to carry out the setting-up since, because of dimensional dispersion of the components of control linkage, it is not possible to obtain optimal operation while always positioning the remote control at the same place on the casing.

Incorrect positioning of the sheath on the casing may cause what is known as the spring effect.

This is manifest as inconvenience for the user, who can not manage to set the knob of the control panel at its end stop. This happens because, when the knob is turned to the end stop, the flap arrives at its end stop before the knob of the control panel. As a result the kinematic linkage is deformed (buckling of the cable, bending of the flap, twisting of the lever, etc.) thereby creating a resisting torque which, if it is greater than the latching torque of the control panel, (i.e.) the torque holding the knob in one position or notch of the control panel, and which must be overcome in order to release the knob from the notch for shifting tends to make the knob come out of its end-stop position, hence the spring effect.

It is, obviously, possible to avoid this spring effect:
  either by increasing the travel of the flaps for the same travel of the control knob, which widens be setting-up range, but exhibits the major drawback of substantially increasing the admissible leakage;
  or by increasing the latching torque when the control knob reaches its end stop, which gives rise to poor uniformity, since the forces are small except when the knob comes to the end stop, and may be countered only by increasing the overall forces on the control knob.

French Patent Application No 2 737 864 (BEHR) describes a closure flap intended to guarantee reliable leaktightness in the closed position of the flap, despite the relatively large discrepancies in position of the flap. To this end the flap exhibits a sealing lip arranged on the outer side of a part of the flap which forms a frame, and linked to the inner body of. The flap by means of an elastic linking element. The operating forces of the flap are transmitted to the inner body by means of an elastically deformable coupling element.

French Patent Application No 2 679 621 filed by the Applicant proposes a device for control of two flaps which are actuated remotely by the same control means. In order to absorb any manufacturing and/or assembly tolerances which are likely to induce an undesirable angular offset of the flaps, while ensuring leaktight blocking of the orifices, the device proposes to link at least one of the flaps to its control means via a flexible coupling, which consists of an elastomer sleeve that provides an elastic link between the control shaft and the spindle of the flap.

The solutions proposed by the two references are not specifically designed to dispense with the setting-up and avoid the spring effect. The references amount to taking action on the range of adjustment of the exhibiting the drawback of fluttering of the flap during variations in the dynamic pressure, by reason of the elastic coupling between the flap and its control shaft.

The subject of the Patent Application GB 2 322 181 (ITW ATECO) is an actuating device in which the control knob is not coupled directly to the flap. On the contrary, this coupling is achieved indirectly with a rotary damper which includes a rotor and a pinion which are housed in a cylindrical receptacle filled with a damping liquid such as silicone oil, in such a way as to create a given friction force which has to be overcome when the pinion is activated. The problem this system aims to resolve is that of noise which the rapid closing of a flap produces, and this problem is resolved by the combination of the abovementioned rotary damper and a lever with two arms. This two-armed lever has a first arm consisting of an elastic strip and a second arm consisting of a toothed sector which drives the pinion of the rotary damper.

When the device is actuated, the elastic strip starts to bend by reason of the damping torque of the damper, until this torque is overcome, resulting in a retarded and damped control of the flap.

It will be noted that, in this system, there is no one-to-one correspondence between the position of the knob and the position of the flap by reason of the slippage introduced by the rotary damper.

The operation of this device implies an initial storage of energy (at the start of the actuation) which is then recovered at the end of travel.

This energy storage and recovery process, with the losses which result therefrom, particularly in the rotary damper, require an increase in the force exerted on the knob.

The device described in the Patent Application GB 2 322 181 also has the drawback of being complicated, since it implies the addition:
  of a very flexible lever with large range of travel which has to be dimensioned to store and return the energy required to cause the flap to close at the end of travel; and
  of a rotary damper.

None of the devices analyzed above is therefore capable, without conspicuous drawbacks, of resolving the problem of the spring effect, and of dispensing with the setting-up of the remote control.

OBJECT OF THE INVENTION

An aim of the invention is at least partly to remedy the spring effect by reducing the resisting torque, for a given deformation of the system, by the introduction of an elasticity remote both from the flap in order to avoid the abovementioned drawbacks, as well as from the control panel in order to avoid introducing flexibility thereto which would cause an effect simular to the spring effect which is sought to be eradicated. That being so, the troublesome effects induced by the introduction of elasticity into the kinematic linkage are masked by friction in the kinematic linkage.

If the deformation of the system can be managed without generating the spring effect over a distance which is greater than or equal to the dimensional dispersion on the components of the linkage, then it is permissible to dispense with the setting-up by always positioning the remote control at the same place on the casing, and particularly by replacing the clamp by a clip delivered with the remote control.

SUMMARY OF THE INVENTION

The invention relates to a control device for at least one flap, including a control member and a kinematic control linkage of the direct-coupling type, arranged between the control member and said flap. The kinematic linkage particularly includes a sheathed cable fixed close to its two ends, wherein the kinematic linkage includes at least one elastic element arranged in such a way as to confer deformability by flexing on the kinematic linkage when a said flap is at its end stop.

The kinematic linkage generally includes: 1) a first lever the movement of which is controlled by the control member and which includes a first receiver element including a housing that accommodates an upstream end of the cable and/or 2) a second lever which includes a second receiver element including a housing that accommodates a downstream end of the cable in order to control the movement of the second lever, that drive said flap in rotation about an axis of rotation. At least one said lever may include a said elastic means.

According to a first variant, this elastic means is advantageously an elastic arm, which is arranged between said receiver element and a central region of the lever. This elasticity can be obtained either by modifying the cross-section of the component over a certain distance, or by overmoulding the component with an elastic material such as an elastomer.

According to a preferred embodiment, the device exhibits two end stops situated on either side of the elastic arm so as to obtain an effective end stop to the movements of the elastic arm on either side of their rest position.

According to a second variant, at least one said lever exhibits two elastic arms arranged between said receiver element and a central region of said lever. Preferable, the central region of the lever exhibits an elongation arranged between said two elastic arms so as to obtain an effective end stop to the movement of the elastic arms on either side of their rest position.

According to yet another embodiment, at least one end of the cable is coupled elastically to the corresponding receiver element.

The deformation by flexing as perceived at the level of the cable advantageously lies between 0.15 mm/N and 0.3 mm/N.

BRIEF DESCRIPTION OF THE DRAWINGS

Other characteristics and advantages of the invention will emerge better upon reading the description which will follow, given by way of non-limiting example, in connection with the drawings attached hereto in which:

FIG. 1a represents a diagram of a control device for a flap;

FIGS. 1b to 1d illustrate the influence of the dimensions which, because of their dispersion, are at the origin of the setting-up of the remote control;

DESCRIPTION OF THE PREFERRED EMBODIMENT

Figure 2A:
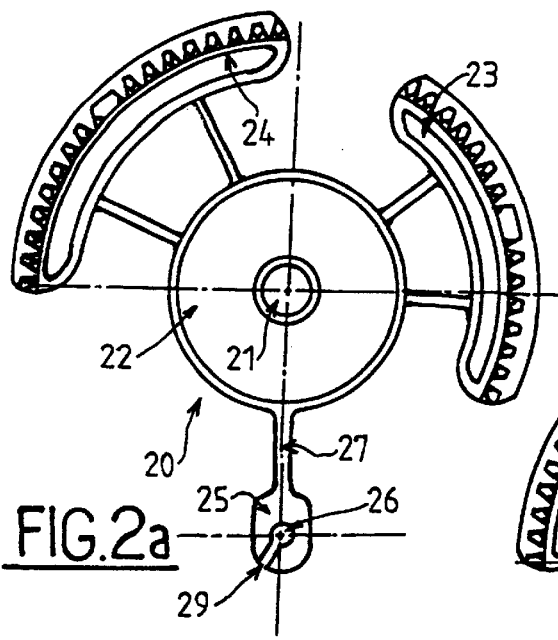
FIGS. 2a to 2d represent embodiments of a lever or control quadrant of two flaps for implementing the invention.

In the various figures, like reference numerals refer to like parts.

FIG. 1a represents a control device for a flap including a control knob 1, and a lever 2 rotation of which is controlled by the control knob arranged on a control panel (or dashboard), not represented, of a motor vehicle.

The lever 2 has a region 3 for fastening one end 4 of a cable 5 having a sheath 6. The other end 7 of the cable is fastened to a fastening region 8 of a lever 9 the rotation of which controls that of a shaft 10 for control of a flap 11, here of flag type, articulated on bearings 12.

The torque to be exerted on the knob in order to move the flap generally lies between 0.1 and 0.4 Nm.

FIGS. 1b to 1d indicate the dimensions which have a direct influence on the setting-up of the remote control.

On the control panel, A denotes the inclusive length, when the control knob (not represented) is at its end stop, between the center of a the housing 3 which accommodates the end 4 of the cable and the left-hand end of a sheath attachment 3' situated on a mechanism plate of the control panel 1'.

On the casing (FIG. 1d), C denotes the length, when the flap 11 is at its end stop on the part 11', between the center of the housing 8 which accommodates the end 7 of the cable and the right-hand end of the sheath attachment 8' situated on the casing.

On the remote control, B denotes the length made up of the sum $B_1+B_2$, $B_1$ being the length between the center of the end 4 of the cable and the left-hand end of the clamp 14, and B2 being the length between the center of the end 7 of the cable and the right-hand end of the clamp 17.

The setting-up of the remote control comprises positioning the clamp on the sheath in such a way that B=A+C.

The invention comprises taking action on the length C by giving it the possibility of adapting, by deformation, to the length B−A. B is then taken to be constant (in terms of nominal value) which means that the clamp is always at the same position on the sheath and that the setting-up can be dispensed with.

According to the invention, in order for the length C to be able to adapt to the length B−A, flexibility is introduced into the kinematic linkage which goes from the control knob, not inclusive, to the flap, not inclusive.

This flexibility makes it possible to reduce the resisting torque and consequently to allow the latching torque to become greater than the resisting torque.

This flexibility or elasticity is introduced sufficiently far from the flap or flaps to avoid fluttering of the flaps due to the variations in dynamic pressure, which would be liable to cause noise and/or problems of leaktightness, and sufficiently far from the control panel for the user not to perceive as such the newly introduced flexibility, which would be perceived in the same way as the spring effect which is sought to be eradicated.

Because the elasticity is introduced outside the control panel and the flap or flaps, its effect is damped by the friction due to the end components (friction of the flap on its bearing or bearings, friction of the control knob on its spindle, etc.), and to the kinematic linkage.

FIG. 2a represents a molded-plastic distribution quadrant 20, moveable in rotation about a spindle 21 and intended for controlling the movement of two flaps (not represented), by means of two engaging sectors 23 and 24.

The end 7 of the cable carries an end part of the barrel type which is inserted through a slot 29 in a housing 26 of a control spigot 25 which constitutes a receiver element and which is linked to the central part 22 (or body) of the distribution quadrant 20 by means of an elastic strip 27, the length and the thickness of which are chosen in such a way as to obtain flexibility, for example, of the order of 0.15 mm/N to 0.30 mm/N (if a force of 1 N is exerted along the cable in the region of the housing 26 and perpendicularly to the strip 27, there will be a movement of the housing of 0.15 mm to 0.3 mm). That makes it possible, in a controlled way, to introduce flexibility into the kinematic linkage, in order to cause the elastic strip 27 to flex at the end of travel of the control knob with a force which can remain less than the latching force. In contrast, in the rest of the travel of the control knob, the elastic strip is stressed little by the force exerted on the control knob and its flexing has no noticeable influence on the operation.

Figure 2B:
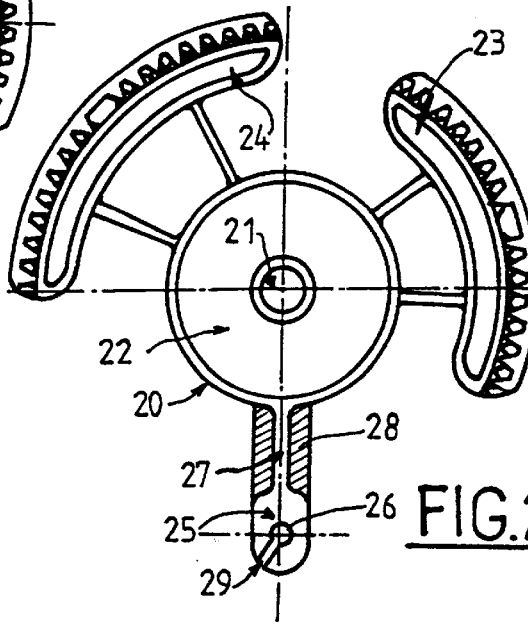

FIG. 2b represents a variant of the preceding device, for which the same reference signs designate the corresponding elements. In this variant, the fatigue strength of the elastic strip 27 is enhanced by an overmoulding 28 of an elastic material, for example an elastomer, which provides a return force for the spigot 25.

Figure 2C:
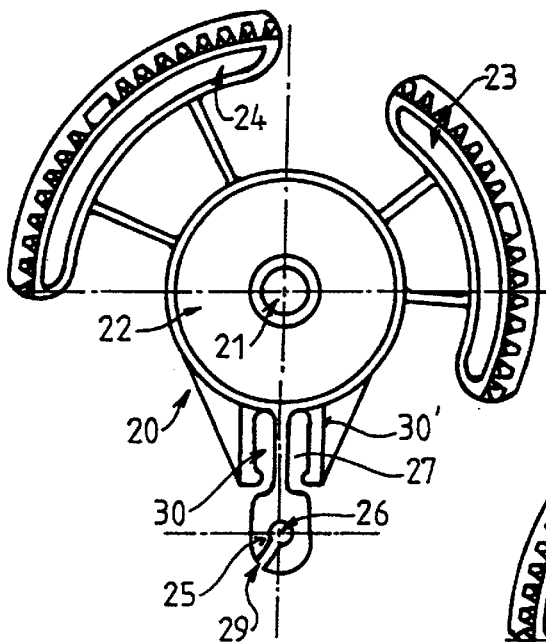

FIG. 2c represents a variant of the device described in FIG. 2a for which the same reference signs designate the corresponding elements. In this variant, the lateral travel of the spigot 25 is limited by the clearance existing between the strip 27 and the end stop 30 on the one hand, and the strip 27 and the end stop 30' on the other hand. Between the two end stops 30 and 30', the strip 27 has the same flexing as the strip of FIG. 2a. The advantage of this variant lies in the fact that the strip 27 cannot deflect as far as into a plastic domain, which would have the consequence that this strip could not come back to initial position. The clearance between the strip 27 and the end stops 30 and 30' should therefore be dimensioned in such a way that it is greater than the sum of the dispersion on the dimensions A, B and C. of FIG. 1b. The movement necessary to exceed the dispersions on the dimensions A, B and C is estimated at ±3 mm.

Hence, in normal operation, the strip 27 never reaches the end stops 30 and 30'.

In the event of abnormal operation of the kinematic linkage which creates an increase in the operating torque (example: burrs in the casing), then the strip 27 deflects until it comes up against the end stops 30 or 30'. Thereafter, the system is no longer flexible in the region of the quadrant 20 and another component of the kinematic linkage is stressed in order to pass the hard point. Hence, the elastic limit of the strip 27 is never exceeded.

Figure 2D:
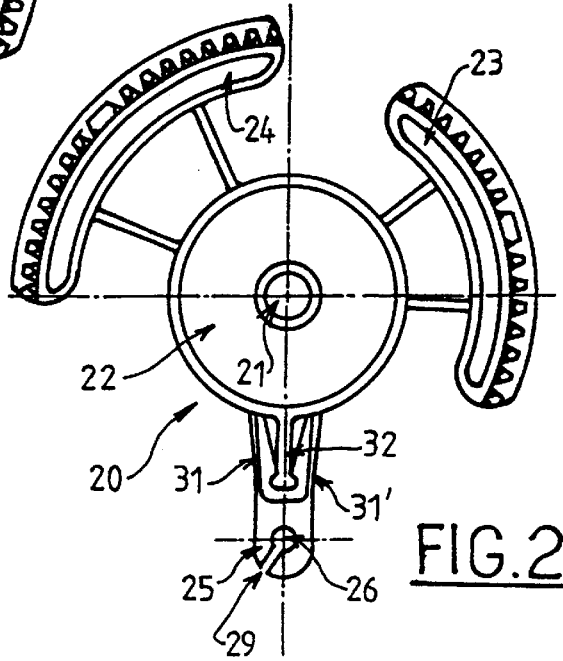

FIG. 2d represents a variant of FIG. 2c in which two integrated elastic strips 31 and 31' replace the single strip 27 of FIG. 2c. A central end stop 32 plays the same role as the end stops 30 and 30' of FIG. 2c. The advantage of this variant lies in the fact that the two elastic strips 31 and 31' make it possible to prevent any problems with twisting.

The embodiments of FIGS. 2a, 2b, 2c and 2d, introduce elasticity between the point of attachment of the end 7 of the cable 5 and the body 22. They can also be applied to a control lever for a single flap, such as the lever 9 and/or, as far as the end 4 of the cable is concerned, and to a lever such as the lever 2.

Figure 3A:
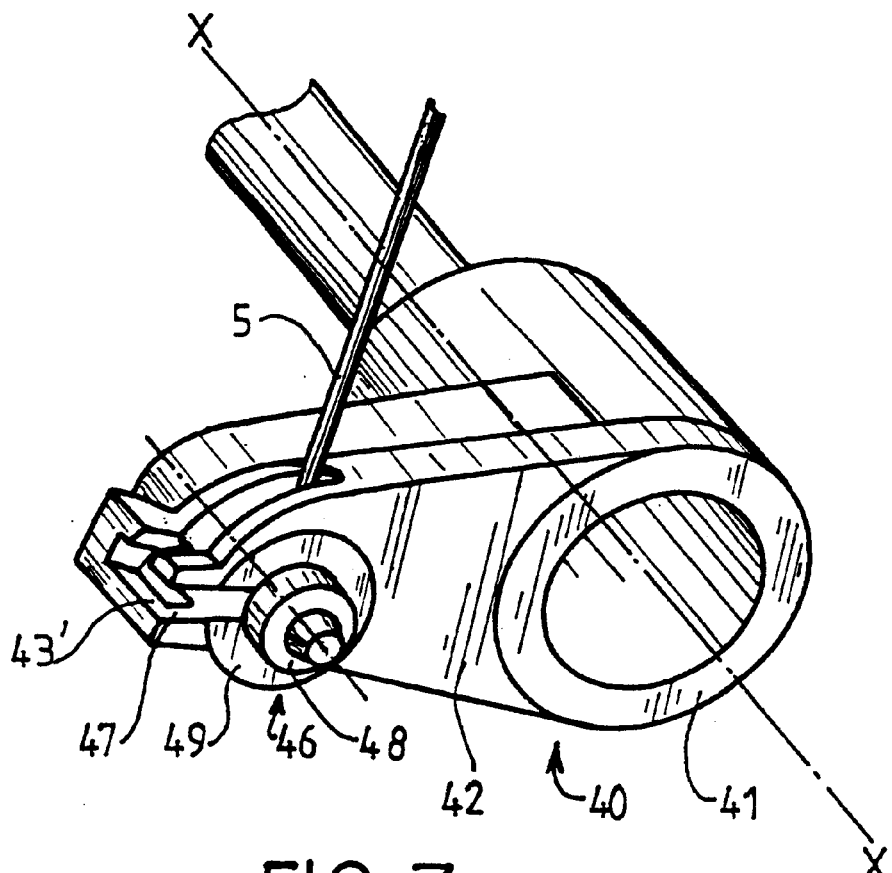
FIGS. 3a, 3b and 3c represent respectively an elastic fastening of a cable onto a lever (FIG. 3a), as well as a first (FIG. 3b) and a second (FIG. 3c) embodiment of this fastening.
Figure 3B:
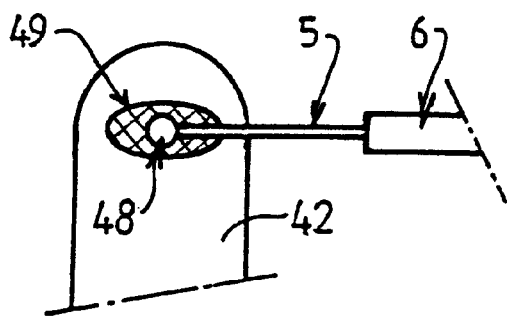
Figure 3C:
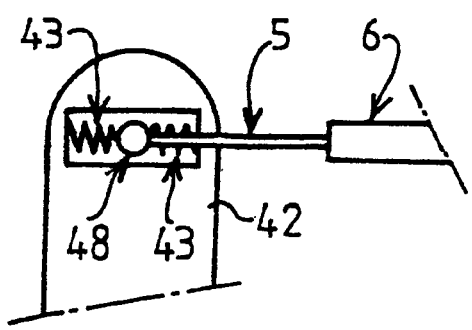

FIGS. 3a to 3c relate to the introduction of elasticity into the link between one end of the cable and its receiver element, the element introducing the elasticity integral with the end part of the cable or the receiver element.

In the embodiment of FIG. 3a, a lever 40, which may be arranged close to the control panel, or which may be a lever for actuating a flap, includes a cylindrical central body 41 and an extension 42, which has an end that includes a slot 47 intended to accommodate an end part 48 of the barrel type. An elastic piece 49, for example an elastomer, which is notched at 43' in the extension of the slot 47, accommodates the end part 48 and obtains the flexibility effect sought.

According to the embodiment FIG. 3b, this elastic piece 49 is a elongate in the direction of the axis of the cable 5. The elastic piece takes the form, for example, of an ellipse with a focal axis is parallel to the cable 5.

According to the embodiment FIG. 3c, elasticity parallel to the axis of the cable is introduced by springs 43 and 44.

What is claimed is:

1. A heating, ventilation and/or air conditioning apparatus including
    a control device; and
    a flap controlled by said control device which includes a control member and a kinematic control linkage of the direct-coupling type arranged between said control member and said flap,
        said kinematic control linkage including a sheathed cable fixed close to a downstream end and an upstream end of said sheathed cable, said kinematic control linkage including at least one elastic element arranged in such a way as to confer deformability by flexing said kinematic control linkage when said flap is at an end stop position.

2. The apparatus as claimed in claim 1, wherein said kinematic control linkage includes a lever which includes a receiver element including a housing which accommodates said downstream end of said sheathed cable in order to control the movement of said lever, said movement driving said flap in rotation.

3. The apparatus as claimed in claim 1, wherein said deformability by flexing, seen from said sheathed cable, lies between 0.15 mm/N and 0.3 mm/N.

4. A heating, ventilation and/or air conditioning apparatus including
    a control device;
    a flap controlled by said control device which includes a control member and a kinematic control linkage of the direct-coupling type arranged between said control member and said flap, said kinematic control linkage including a sheathed cable fixed close to a downstream end and an upstream end of said sheathed cable, said kinematic control linkage including at least one elastic element arranged in such a way as to confer deformability by flexing said kinematic control linkage when said flap is at an end stop position, said kinematic control linkage including a first lever the movement of which is controlled by said control member and which includes a first receiver element including a first housing which accommodates said upstream end of said sheathed cable.

5. The apparatus as claimed in claim 4, wherein said first lever includes said elastic element.

6. The apparatus as claimed in claim 5, said first lever having a central region, wherein said elastic element is an elastic arm, arranged between said first receiver element and said central region.

7. The apparatus as claimed in claim 6, wherein said elastic arm is surrounded by an overmoulding of an elastic material.

8. The apparatus as claimed in claim 6, further including two end stops situated on either side of said elastic arm to stop the movements of said elastic arm beyond said end stop position.

9. The apparatus as claimed in claim 4, said first lever having a central region. wherein said first lever includes two elastic arms arranged between said first receiver element and said central region of said first lever.

10. The apparatus as claimed in claim 9, wherein said central region of said first lever includes an elongation arranged between said two elastic arms which stop the movement of said elongation beyond said end stop position defined by each of said two elastic arms on either side of a rest position of said elongation member.

11. The apparatus as claimed in claim 4, wherein at least one end of said sheathed cable is coupled elastically to said first receiver element.

12. The apparatus as claimed in claim 4, wherein said deformability by flexing of said kinematic control linkage, seen from said sheathed cable, lies between 0.15 mm/N and 0.3 mm/N.

13. A heating, ventilation and/or air conditioning apparatus including
a control device;
a flap controlled by said control device which includes a control member and a kinematic control linkage of the direct-coupling type arranged between said control member and said flap, said kinematic control linkage including a sheathed cable fixed close to a downstream end and an upstream end of said sheathed cable, said kinematic control linkage including at least one elastic element arranged in such a way as to confer deformability by flexing said kinematic control linkage when said flap is at an end stop position, said kinematic control linkage including a first lever the movement of which is controlled by said control member and which includes a first receiver element including a first housing which accommodates said upstream end of said sheathed cable, said kinematic control linkage including a second lever which includes a second receiver element including a second housing which accommodates said downstream end of said sheathed cable in order to control the movement of said second lever, said second lever driving said flap in rotation.

14. The apparatus as claimed in claim 13, wherein at least one said fist lever and said second lever includes said elastic element.

15. The apparatus as claimed in claim 14, said first lever and said second lever having a central region, wherein said elastic element is an elastic arm arranged between one of said receiver elements and a corresponding central region.

16. The apparatus as claimed in claim 15, wherein said elastic arm is surrounded by an overmoulding of an elastic material.

17. The apparatus as claimed in claim 15, further include two end stops situated on either side of said elastic arm to stop the movements of said elastic arm beyond said end stop position.

18. The apparatus as claimed in claim 13, said first lever and said second lever having a central region, wherein at least one of said levers includes two elastic arms arranged between its said receiver element and said central region of its corresponding said lever.

19. The apparatus as claimed in claim 18, wherein said central region of said levers includes an elongation arranged between said two elastic arms which stop the movement of said elongation beyond said end stop position defined by each of said two elastic arms on either side of a rest position of said elongation member.

20. The apparatus as claimed in claim 13, wherein at least one end of said sheathed cable is coupled elastically to one of said receiver elements.

21. The apparatus as claimed in claim 13, wherein said deformability by flexing of said kinematic control linkage, seen from said sheathed cable, lies between 0.15 mm/N and 0.3 mm/N.

22. A vehicle comprising said heating, ventilation and/or air conditioning apparatus of claim 1.

23. A vehicle comprising the heating, ventilation and/or air conditioning apparatus of claim 13.

24. A ventilation apparatus comprising:
a flap having an end stop position;
a control member; and
a kinematic linkage of the direct-coupling type linking said control member and said flap, said kinematic linkage including:
    a cable having an upstream end and a downstream end, said cable fixed proximate said upstream end and said downstream end; and
    an elastic element arranged in such a way as to flex said kinematic linkage when said flap is in said end stop position.

25. The apparatus as claimed in claim 24 wherein said kinematic linkage further comprises:
a first lever including a first receiver and having an upstream end and a downstream end, said upstream end of said first lever connected to said control member, said first receiver at said downstream end of said first lever connected to said upstream end of said cable.

26. The apparatus as claimed in claim 25 wherein said kinematic linkage further comprises:
a second lever including a second receiver and having an upstream end and a downstream end, said second receiver at said upstream end of said second lever connected to said downstream end of said cable, said downstream end of said second lever connected to said flap, movement of said second lever driving said flap in rotation.

27. The apparatus as claimed in claim 26, wherein at least one of said first lever and said second lever includes said elastic element.

28. The apparatus as claimed in claim 27, said first lever and said second lever having a central region, wherein said elastic element is an elastic arm arranged between said first receiver and corresponding said central region of said first lever or said second lever and corresponding said central region of said second lever.

29. The apparatus as claimed in claim 28 further including two end stops situated on either side of said elastic arm to stop the movements of said elastic arm beyond said end stop position.

30. The apparatus as claimed in claim 27, said first lever and said second lever having a central region, wherein at least one of said first lever and said second lever includes:
two elastic arms arranged between corresponding said receiver and corresponding said central region; and
an elongation extending from corresponding said central region, said elongation arranged between said two elastic arms which stop the movement of said elongation beyond said end stop position defined by each of said two elastic arms on either side of a rest position of said elongation member.

31. The apparatus as claimed in claim 26, wherein at least one of said upstream end and said downstream end of said cable is coupled elastically to one of said first receiver and said second receiver.

32. The apparatus as claimed in claim 24 wherein said kinematic linkage is capable of deforming between 0.15 mm/N and 0.3 mm/N when flexed.

* * * * *